United States Patent Office 3,427,361
Patented Feb. 11, 1969

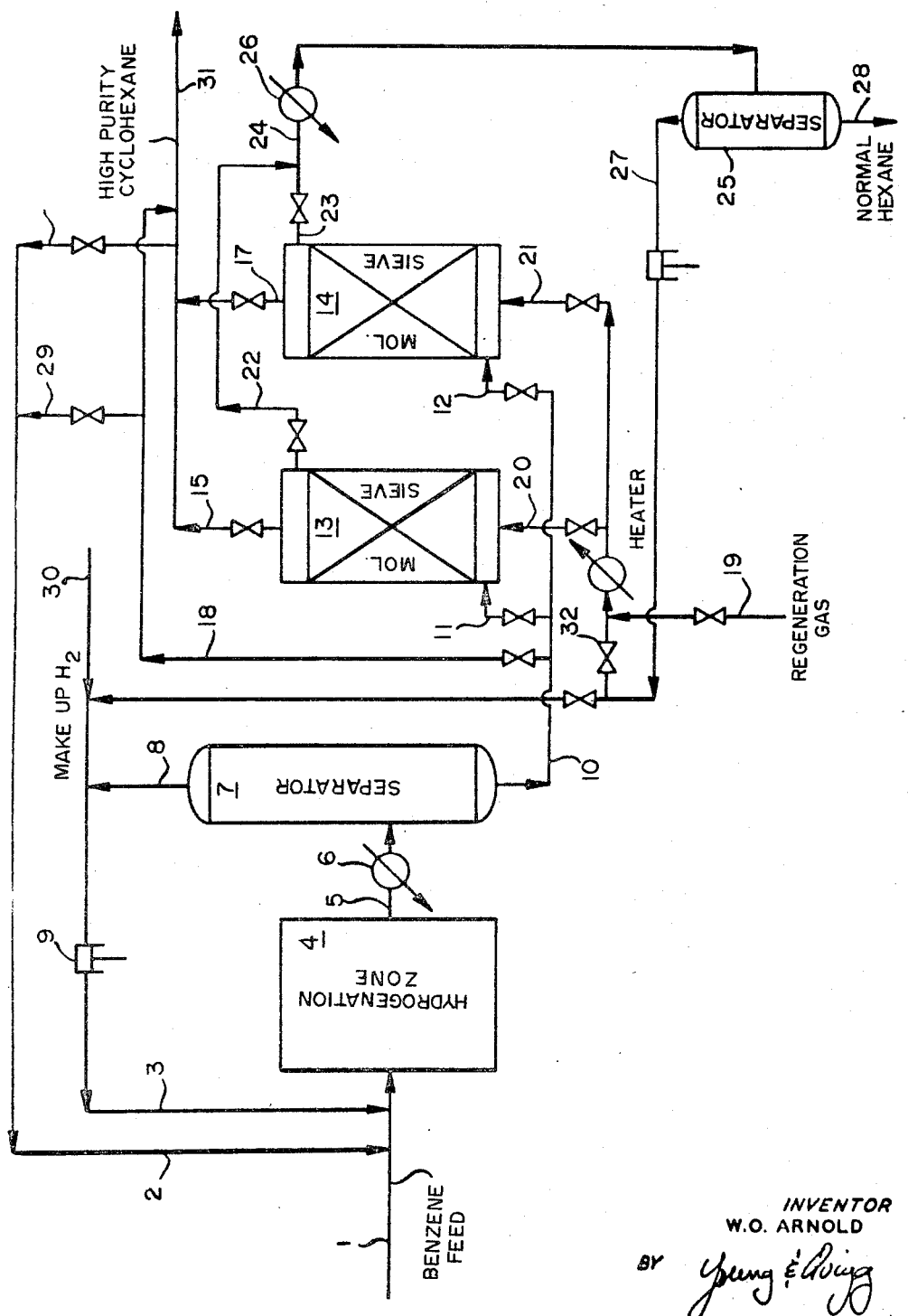

3,427,361
HYDROGENATION
William O. Arnold, Sweeny, Tex., assignor to Phillips
Petroleum Company, a corporation of Delaware
Filed Mar. 17, 1966, Ser. No. 535,061
U.S. Cl. 260—667                    3 Claims
Int. Cl. C07c 5/10; B01d 15/00

ABSTRACT OF THE DISCLOSURE

In the adiabatic hydrogenation of benzene in the presence of cyclohexane diluent, the concentration of benzene in the feed is increased above the maximum amount which would result in a reaction effluent of a desired purity, and at least a portion of the resulting reaction effluent of lowered purity is passed through a molecular sieve bed to obtain the desired product purity. Thus, for nickel on kieselguhr with an initial feed temperature of 330° F., the benzene concentration is raised to approximately 7 volume percent, resulting in a final temperature of about 470° F. and a reaction effluent containing approximately 98 volume percent cyclohexane, part of which is passed through a molecular sieve bed and readmixed with the remainder to obtain a purity of 99.7 volume percent.

---

This invention relates to hydrogenation of a hydrogenatable hydrocarbon. In one of its aspects, it relates to the hydrogenation of benzene wherein the effluent from the hydrogenation zone is treated to separate cyclohexane from n-hexane. In another of its aspects, the invention relates to the hydrogenation of benzene wherein the temperature of the reaction during the operation increases to maximum possible temperature for the catalyst, and the effluent from the reaction zone is treated to remove n-hexane therefrom. In still another aspect, the invention relates to the hydrogenation of benzene wherein sufficient amount of benzene is present in the feed to increase the temperature of reaction about 140° F., and n-hexane is removed from the effluent from the hydrogenation zone by means of a molecular sieve. In a still further aspect, the invention relates to the production of high purity cyclohexane by feeding about 7 percent benzene at about 330° F. over suitable catalyst in contact with hydrogen so that the temperature of the reaction increases to about 470° F., removing non-condensible gases from the effluent of the reaction zone, passing the effluent to a molecular sieve to remove n-hexane, recovering high purity cyclohexane from the effluent from the molecular sieve, and recycling a portion of the cyclohexane product as a diluent to the process.

In the conventional hydrogenation of benzene to cyclohexane, it is desirable to produce a high purity product (99.7 percent cyclohexane, 0.3 percent n-hexane). This high purity product can be produced by maintaining the temperature in a hydrogenation reaction zone between an inlet temperature of about 330° F. and an outlet temperature of about 430° F. The lower the temperature in the reaction zone, the greater the tendency to produce higher high purity product. As the temperature is increased, an increase in the amount of n-hexane forms. A minimum temperature of 330° F. is required for the operation to proceed with a catalyst such as nickel on kieselguhr. The hydrogenation reaction is exothermic. Thus, the amount of benzene which can be added to the feed is limited by the maximum permissible temperature increase in the reaction zone. Generally, about 1 percent benzene in the feed will cause a temperature increase of about 20° F. during the hydrogenation reaction. Thus, for a temperature rise of 100° F., about 5 percent benzene is added to the feed. Liquid cyclohexane produced in the process is recycled to the operation as a diluent. The diluent makes up the other 95 percent of the feed. Additionally, of course, hydrogen is added to hydrogenate the benzene to cyclohexane.

I have now discovered that the amount of cyclohexane produced in the conventional operation can be substantially increased by using a separation zone such as a molecular sieve to remove impure n-hexane from the hydrogenated effluent. The use of the separation zone allows the reactor effluent temperature to be increased up to the maximum permissible limit for the catalyst which permits increased amounts of benzene to be added to the feed.

By various aspects of this invention, one or more of the following, or other, objects can be obtained.

It is an object of this invention to provide an improved hydrogenation process for producing high purity cyclohexane wherein the amount of cyclohexane produced is substantially increased without lowering the purity of the final product.

It is a further object of this invention to provide an improved hydrogenation process for producing high purity hydrogenated hydrocarbon wherein the reaction can be carried out at the maximum catalyst temperature (reactor effluent) for increased production of hydrogenated hydrocarbon.

According to the invention, a hydrogenatable hydrocarbon is hydrogenated by admixing the hydrocarbon with hydrogen and diluent and passing the mixture into a hydrogenation zone wherein the mixture contacts a catalyst under suitable hydrogenation conditions. The temperature in the reaction zone is limited by the maximum permissible limit of the catalyst. The effluent from the hydrogenation reaction zone is passed to a separator wherein hydrogen is removed and further passed to a second separation zone wherein impurities are removed. A portion of the purified hydrogenated hydrocarbons can be recycled and used as a diluent.

The process is particularly suitable for hydrogenating benzene to cyclohexane.

A wide variety of catalysts can be used in the operation. Catalysts suitable for use in the practice of this invention are those which are capable of causing the hydrogenation of benzene to cyclohexane. Examples of such catalysts include, among others, the following: nickel, platinum, palladium, iron, Raney nickel, etc. These materials are generally finely divided and are composited with a porous support or carrier such as the various forms of alumina, silica, alumina-silica coprecipitate, kieselguhr, diatomaceous earth, magnesia, zirconia, or other inorganic oxides, either alone or in combination. Many forms of such catalysts are available commercially. A presently preferred catalyst for use in the practice of the invention is nickel composited with kieselguhr.

The hydrogen employed in the practice of the invention can be obtained from any suitable source. Said hydrogen can be either electrolytic hydrogen of high purity or can be a hydrogen-containing stream recovered from catalytic reforming operations, or other petroleum refining operations. In order to maintain the catalyst at a high level of activity the hydrogen-containing stream recovered from said reforming or other operations is usually scrubbed with a strong caustic solution or passed through a bed of flake caustic (NaOH) to remove sulfur compounds. It is also preferred to remove the $C_4$ and heavier hydrocarbon materials contained in such streams by contacting the gas stream with a suitable absorbent as in conventional absorption processes.

The temperature of the hydrogenation process will depend for the most part upon the catalyst used. Generally, the range of temperature in accordance with my invention will be a reactor inlet temperature of 330 to 470° F. outlet temperature in the case of nickel on kieselguhr catalyst. As has been mentioned earlier, the temperature is influenced by the percentage of benzene in the feed since the reaction is exothermic. Thus, in an adiabatic zone, the temperature would increase from the upstream end to the downstream end of the zone.

The benzene used in the process can be obtained from many sources. Generally, high purity benzene is preferred, but not essential.

I have found that in the hydrogenation of benzene to cyclohexane, a molecular sieve is particularly advantageous in removing impurities such as n-hexane from the cyclohexane. It is, however, within the scope of the invention to use other separation means, such as fractionation, in the practice of the invention.

The invention will now be described with reference to the accompanying drawing which shows an embodiment of the invention.

Referring now to the drawing, which will be described with reference to the hydrogenation of benzene to cyclohexane, benzene feed in line 1 is admixed with cyclohexane in line 2 and hydrogen line 3 and passed to hydrogenation reactor 4 which contains a catalyst suitable for hydrogenating benzene to cyclohexane. The hydrogenation reactor 4 operates under conditions suitable for hydrogenating benzene to cyclohexane. Generally, however, the feed will enter the reactor at about 330° F. and as the reaction proceeds, the temperature of the mixture will be raised to about 470° F., the maximum allowable temperature for the preferred nickel on kieselguhr catalyst. The effluent from reactor 4 is passed through line 5, cooled in cooler 6 and passed to separator 7 wherein hydrogen removed through line 8 is separated from liquid products in line 10. The hydrogen is compressed in compressor 9 and recycled to the operation. The liquid product in line 10 is passed through line 11 and/or 12 to molecular sieves 13 and/or 14. When the temperature in the hydrogenation reactor reaches 470° F., there will be about 2 percent n-hexane in the effluent. If the entire cyclohexane stream is passed through the molecular sieve zone, the normal hexane content therein can be reduced to about 0.02 volume percent. This is the percent of normal hexane in the product in lines 15 and/or 17. However, since at present a cyclohexane purity of 99.7 percent is satisfactory, only a portion of the cyclohexane stream is charged to the sieves, and the remainder is passed to line 18 and admixed with the material from lines 15 and/or 17 to yield the desired purity product cyclohexane in line 31. The recycled cyclohexane diluent is charged preferably by way of line 18 and line 29 to line 2. However, diluent cyclohexane can be recycled from the sieve treatment through line 16.

Generally, when one of the molecular sieves 13 and 14 is operating to remove n-hexane, the other molecular sieve will be on regeneration. The regeneration can be accomplished by passing a regeneration gas such as hydrogen through line 19 and through line 20 or 21 to a molecular sieve which is on regeneration. The hydrogen will remove n-hexane from a molecular sieve. The effluent regeneration gas is passed through line 22 or 23, line 24, through cooler 26 to separator 25 wherein n-hexane is removed through line 28 and hydrogen is removed through line 27, compressed, and passed to line 3 as a reactant in the process, or as a portion of the regeneration gas by way of line 32. Make-up hydrogen can be added through line 30.

While the invention has been described in the drawing with reference to the hydrogenation of benzene to cyclohexane, it is obvious that the invention is applicable to hydrogenation of other hydrocarbons. Further, although the use of a molecular sieve is particularly advantageous for the removal of n-hexane from cyclohexane, it is obvious that other separation means such as a fractionator can be used.

The following specific example, which sets forth material balance and operating conditions for the hydrogenation of benzene to cyclohexane and purification as it applies to a system described in the drawings, further exemplifies the invention.

SPECIFIC EXAMPLE

|  |  | Prior Art | System of Invention |
|---|---|---|---|
| (1) | Benzene Feed, B/H | 100 | 140 |
| (2) | Cyclohexane diluent, B/H | 1,900 | 1,860 |
|  | Total, B/H [a] | 2,000 | 2,000 |
|  | Reactor Inlet Temp., °F | 330 | 330 |
|  | Reactor Outlet Temp., °F | 430 | 470 |
| (10) | Cyclohexane Product, B/H | 100 | 140 |
|  | Vol. Percent Cyclohexane | 99.7 | 98.0 |
|  | Vol. Percent Normal Hexane | 0.3 | 2.0 |
| (11) | Charge to Molecular Sieve, B/H [b] | None | 120 |
| (18) | By-Pass Sieve, B/H | 100 | 20 |
| (31) | Cyclohexane Product, B/H [c] | 100 | 137.6 |
|  | Vol. Percent Cyclohexane | 99.7 | 99.7 |
| (28) | Normal Hexane Product, B/H | None | 2.4 |

[a] Maximum is 2,000 B/H.
[b] Linde 5 A. Molecular Sieve.
[c] Invention produces 32.6% more $CyC_6$ of same purity.

SYSTEM OF INVENTION

Reactor 4:
Pressure, p.s.i.a. _____ 485
Inlet temp., °F. _____ 330
Outlet temp., °F. _____ 470
$H_2$/benzene mol ratio _____ 6:1
Cyclohexane/benzene vol. ratio _____ 13.3:1

Separator 7:
Pressure, p.s.i.a. _____ 415
Temperature, °F. _____ 100

Mol sieve adsorption 13:
Pressure, p.s.i.g. _____ 200
Temperature, °F. _____ 100

Mol sieve regeneration 14:
Pressure, p.s.i.g. _____ Atmos.
Temperature, °F. _____ 500
Desorption fluid—hydrogen.

By operating according to the invention, it has been found that a 40 percent increase in benzene feed can be attained. This means that an increase of about 40 percent of production of cyclohexane can be obtained.

Reasonable variation and modification are possible within the scope of the foregoing disclosure, the drawing and the appended claims to the invention, the essence of which is that the production of a hydrogenated hydrocarbon is increased by operating the hydrogenation zone at a temperature within the maximum limits of the catalyst used, and separating impurities from the hydrogenated product in a separation zone such as a molecular sieve.

I claim:

1. In a process for hydrogenating benzene to produce a high purity cyclohexane product wherein a minor amount of benzene in a major amount of cyclohexane as diluent is contacted with hydrogen and a nickel-kieselguhr catalyst in an adiabatic reaction zone under conditions suitable to hydrogenate substantially all of said benzene to cyclohexane, said minor amount benzene being less than the minimum amount of benzene which would cause the temperature in said adiabatic reaction zone to increase above the value at which the amount of byproducts would be in excess of the impurity level desired for said high purity cyclohexane product; the improvement of increasing the throughput which comprises increasing said minor amount of benzene above said minimum amount resulting in the production of n-hexane as a byproduct in an amount in excess of said desired impurity level, passing at least a portion of the reaction effluent from said adiabatic reaction zone through a molecular sieve separation zone to remove at least a portion of the n-hexane byproduct, recovering from said molecular sieve separation zone a high purity cyclohexane product stream having an impurity level at least as low as said desired impurity level, passing a second portion of said reaction effluent to said adiabatic reaction zone as the diluent, periodically regenerating said molecular sieve separation zone by passing hydrogen therethrough, separating the resulting regeneration effluent to recover an hexane product stream and a hydrogen stream, and passing said hydrogen stream to said adiabatic reaction zone.

2. A process in accordance with claim 1 wherein the temperature of said reaction effluent is approximately 470° F. as said reaction effluent is withdrawn from said adiabatic reaction zone.

3. A process in accordance with claim 2 wherein said benzene in cyclohexane enters said adiabatic reaction zone at a temperature of approximately 330° F. and said minor amount is increased to approximately 7 volume percent.

References Cited
UNITED STATES PATENTS

| | | | |
|---|---|---|---|
| 2,979,546 | 4/1961 | Grandio et al. | 260—667 |
| 3,070,640 | 12/1962 | Pfeiffer et al. | 260—667 |
| 3,140,322 | 7/1964 | Frilette et al. | 260—666 |
| 3,228,858 | 1/1966 | Matyear | 260—667 |

DELBERT E. GANTZ, *Primary Examiner.*

V. O. KIEFE, *Assistant Examiner.*

U.S. Cl. X.R.

260—666, 676